A. L. BANKER.
WIND SHIELD.
APPLICATION FILED APR. 7, 1910.

968,637.

Patented Aug. 30, 1910
3 SHEETS—SHEET 1.

WITNESSES:

INVENTOR
A. L. Banker
by Paul Synnestvedt
Atty

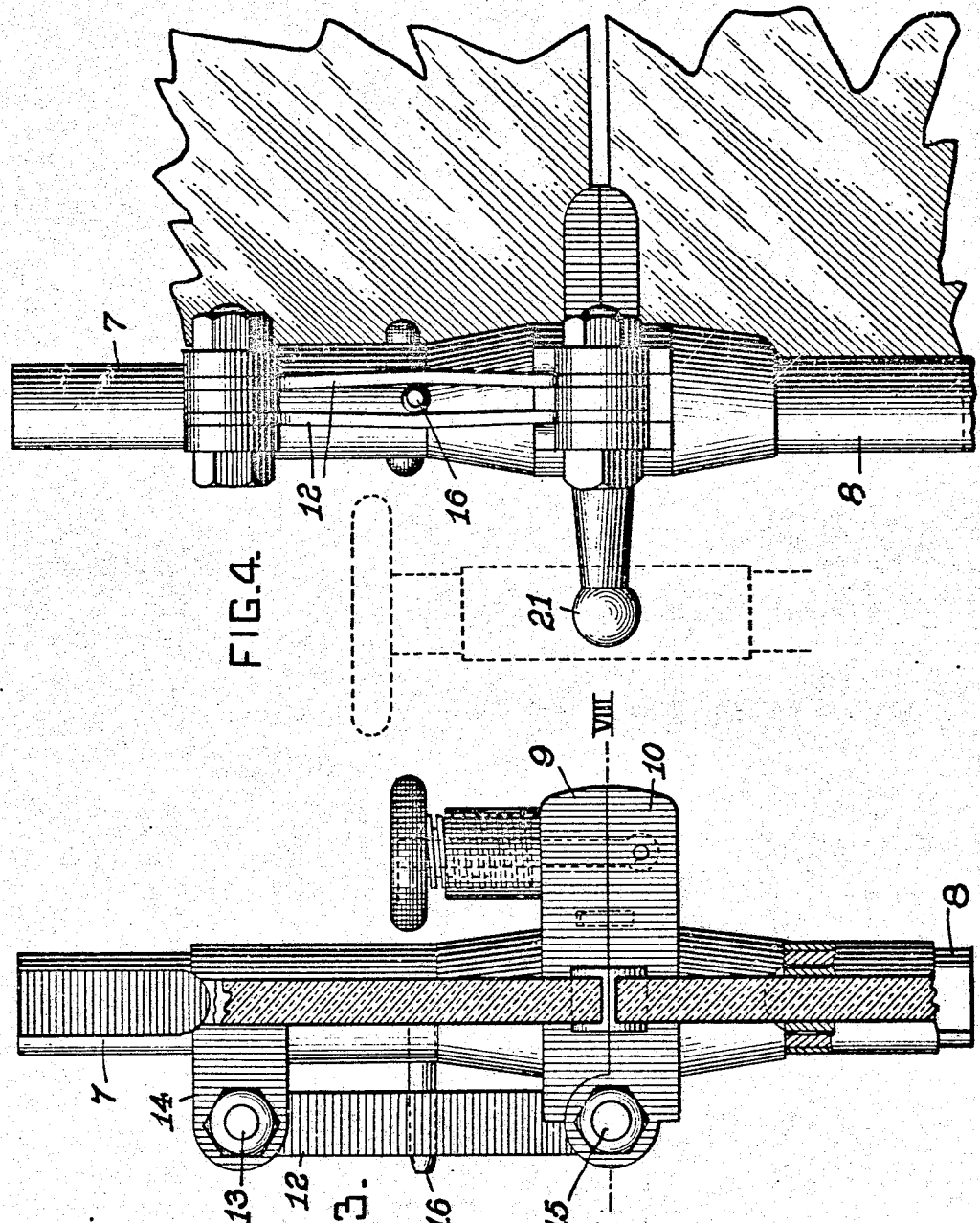

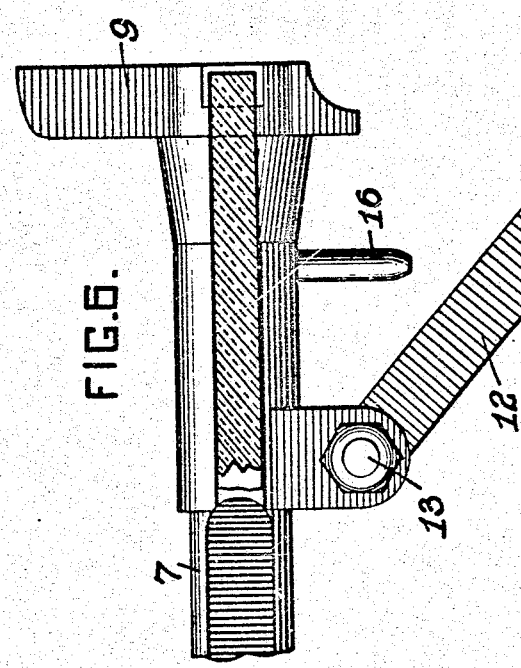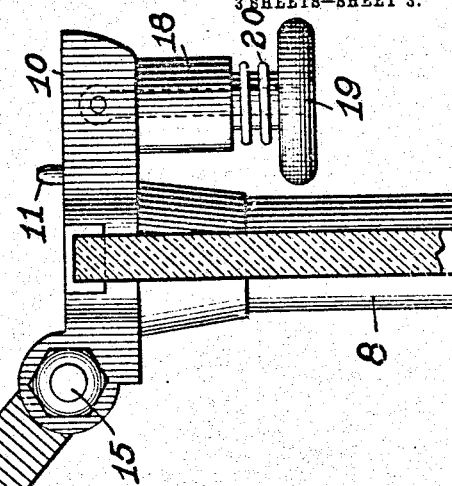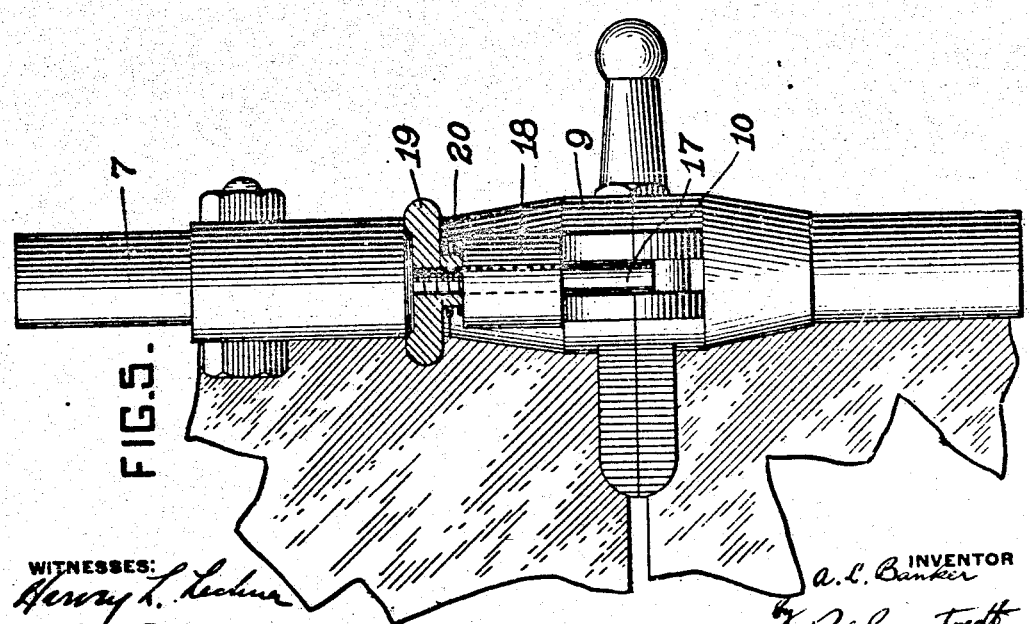

UNITED STATES PATENT OFFICE.

ARTHUR L. BANKER, OF PITTSBURG, PENNSYLVANIA.

WIND-SHIELD.

968,637.  Specification of Letters Patent.  Patented Aug. 30, 1910.

Original application filed July 13, 1909, Serial No. 507,357. Divided and this application filed April 7, 1910. Serial No. 554,038.

*To all whom it may concern:*

Be it known that I, ARTHUR L. BANKER, a citizen of the United States, residing at Pittsburg, in the county of Allegheny and State of Pennsylvania, have invented certain new and useful Improvements in Wind-Shields, of which the following is a specification.

The invention relates to wind shields for use on motor vehicles, and the present application is a division of application Serial No. 507,357. It has for its primary objects; the provision of improved connecting means between the upper and lower portions of the shield whereby the upper portion will not interfere with the steering wheel when being folded backwardly; the provision of improved resilient connecting links between the two portions of the shield whereby the two sides of the upper part of the shield may be readily disengaged in succession without straining the frame or cracking the glass; the provision of an improved arrangement of connecting links and interlocking means between the parts of the shield; and the provision of improved locking means for the upper portion of the shield constructed so as to avoid any possibility of rattling. One embodiment of the invention is illustrated in the accompanying drawings, wherein:—

Figures 3, 4, 5 and 6 are enlarged detail views of the hinge link connecting and locking means between the sections of the shield, Figure 3 being a side elevation of the hinge in closed position, Figure 4 being a rear elevation of the hinge in closed position, Figure 5 being a front elevation of the hinge in closed position, and Figure 6 being a side elevation of the hinge as the upper section of the shield is swung upwardly and backwardly to folded position.

Figure 7 is a section through the tubing employed for the frame of the shield.

Figure 1:
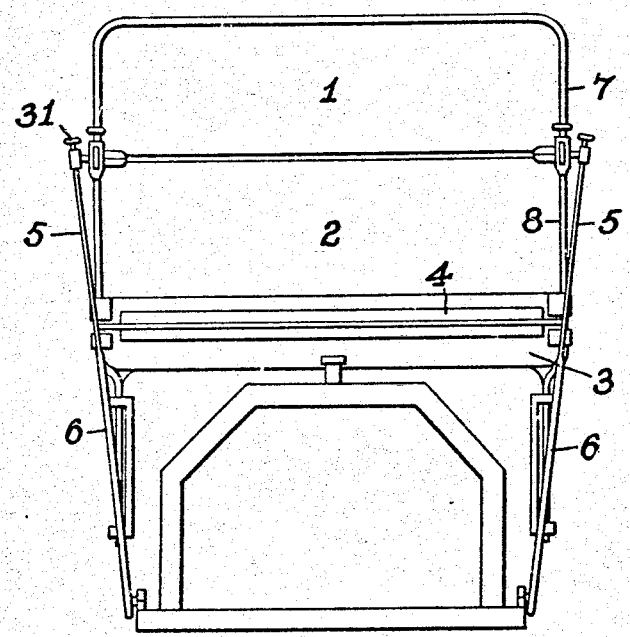
Figure 1 is a front elevation of a vehicle equipped with the improved shield.
Figure 2:
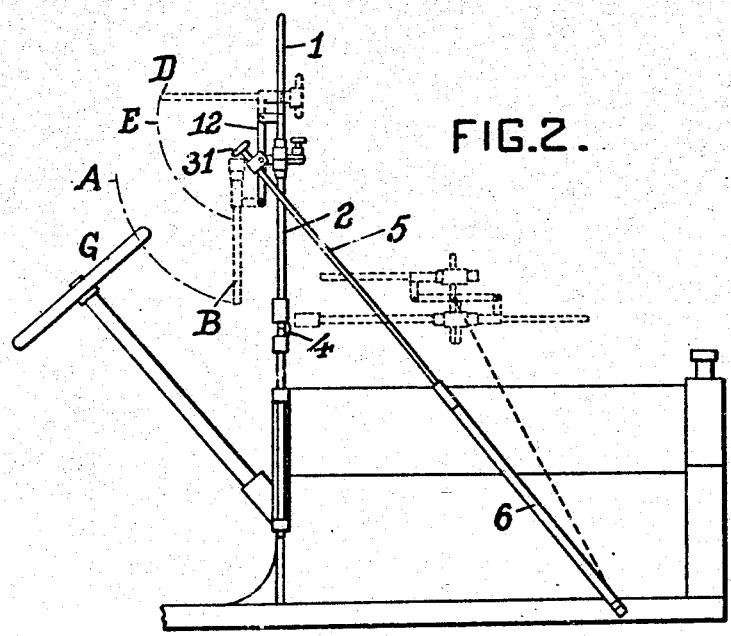
Figure 2 is a side elevation of the front portion of the vehicle with the shield applied thereto, the dotted lines showing the various positions in which the shield may be folded.

Referring to Figures 1 and 2 it will be seen that the shield is made in two sections 1 and 2, hinged together in a manner to be more particularly described hereinafter, and that the lower section 2 is hinged to a removable support 3 upon the rear end of the bonnet of the vehicle by means of the piano hinge 4. The shield is maintained against movement about its hinge 3 by means of the pairs of telescoping rods or tubes 5—6, which rods are connected to the frame and to the shield by means of universal joints. The rods are held against relative movement by means of an internal clamping means shown in detail and claimed in my application Serial No. 507,357 heretofore referred to, which means are operated from the collars 31.

The means whereby the two sections of the shield are hinged together constitute one feature of my invention, and will be seen most clearly by reference to the detail views of Figures 3, 4, 5 and 6. The connection on the two sides of the frame are the same so that a description of one will suffice for both. By reference to these figures it will be seen that the opposing frame members 7 and 8 in which the glass is mounted are provided with the opposing transverse blocks 9 and 10, the block 10 being provided with a pin 11 (Fig. 6) which fits into a recess in the lower surface of the block 9. The two portions of the shield are hinged together by means of the bars 12—12 constituting a connecting link. The upper ends of the bars 12 are pivoted upon the bolt 13 carried by the lug 14, and the lower ends of the bars are carried by the bolt 15 mounted in the rear end of the block 10, the two bars 12 being spaced apart by means of washers as indicated in Figure 4. The frame member 7 is provided with a rearwardly projecting pin 16 of slightly greater diameter than the space between the bars 12—12, so that when the parts assume the position indicated in Figures 3 and 4, the pin is frictionally engaged by the sides of the bars 12, and the parts are held releasably in the position shown. The bars 12 are made of comparatively light springy metal, so that if desired one side of the shield may be disconnected and brought partially to the position indicated in Figure 6, before the other side is so disengaged, and the springiness of the bars 12 will permit of this operation without twisting the frame of the shield or cracking the glass, the deformation involved being taken care of by the resiliency of the bars 12. The engagement of the links by the pins 16 serves to steady and aline the parts when brought to the position of Figure 3, and when the top section is folded back to the position indicated by B in Figure 2 the engagement of the links by the pins serves to hold the upper section against swinging.

The front ends of the blocks 9 and 10 are split or slotted as indicated in Figure 5, and the locking link 17 is pivotally mounted in the slot in the lower block 10. This link 17 carries the collar 18 movable longitudinally thereon and the nut or handle portion 19 screw threaded upon end thereof (Fig. 5). Intermediate the collar and hand nut is a spring 20. When the blocks 9 and 10 are together as indicated in Figure 3, the locking link 17 with its collar is swung to the position shown, thus yieldingly clamping the ends of the two blocks together. The nut or handle 19 may be screwed down tightly after the parts are brought to the position indicated in Figure 3, thus securely and positively locking the parts in position. The spring 20 serves to eliminate all possibility of rattling, particularly when the lock is in in-operative position as indicated in Figure 6.

The purpose in hinging the shield sections 1 and 2 together by means of the links or bars 12 instead of directly is to permit the upper edge of the section 1 to clear the steering wheel when the section 1 is folded back as indicated in dotted lines in Figure 2. If the two sections were hinged together directly at the rear ends of the blocks 9 and 10, the upper edge of the section 1 would move upon the dotted arc marked A in moving to the folded position marked B, during which movement it would strike the edge of the steering wheel C. When the sections are hinged together by means of the links 12, however, the upper section 1 may be swung around the upper ends of the links 12 to the position marked D, and then subsequently moved to vertical folded position with its upper edge swinging on the arc marked E, thus entirely clearing the steering wheel. The shield may then be still further moved downwardly to the position marked B. The shield may be also swung about its hinge 4 so that the entire shield lies extended over the hood as indicated in dotted lines in Figure 2, or the upper section 1 may be folded back upon the lower section 2, and the lower section 2 folded downwardly over the hood, the parts being securely held in adjusted position by means of the rods 5 and 6.

Having thus described my invention and illustrated its use, what I claim as new and desire to secure by Letters Patent is the following:—

1. A wind shield comprising a lower section, an upper section, means for connecting the two sections together comprising a link at each side of the frame and behind the sections pivotally connected at one end to the upper portion of the lower section and at the other end pivotally connected to the upper section above its lower edge, and friction engaging means on the upper section for interlocking with the links when the upper section is folded back against the lower section.

2. A wind shield comprising a lower section, an upper section, means at each side of the frame for connecting the two sections together comprising a pair of spaced resilient bars constituting a link, the said links being pivotally connected at one end to the upper portion of the lower section and at the other end pivotally connected to the upper section above its lower edge, and pins on the rear side of the upper section for fitting with frictional engagement between the pairs of bars constituting the links when the two sections are in substantially alined position and in folded position.

3. A wind shield comprising a lower section, an upper section comprising a frame carrying a glass, means for connecting the two sections together comprising a laterally yieldable link at each side of the frame pivotally connected at one end to the upper portion of the lower section and at the other end pivotally connected to the upper section above its lower edge, and means at each side of the shield whereby the upper section is yieldingly locked to the links.

4. A wind shield comprising a lower section, an upper section, comprising a frame carrying a glass, means for connecting the two sections together comprising a resilient link at each side of the frame pivotally connected at one end to the upper portion of the lower section and at the other end pivotally connected to the upper section above its lower edge, and means at each side of the shield whereby the upper section is yieldingly locked to the links.

5. The combination with a sectional wind shield having side frame members, of means for hinging the opposing side frame members together comprising at each end a pair of coöperating transverse blocks slotted at their outer ends, a pivotal connection between the sections, and means for releasably locking the slotted ends of the blocks together comprising a link pivoted in the slot in one of the blocks and adapted to be swung into the slot in the other block, and a spring-held collar mounted upon the link and adapted to engage the outer side of the opposing block.

6. The combination with a sectional wind shield having side frame members, of means for hinging the opposing side frame members together comprising at each end a pair of coöperating transverse blocks slotted at their outer ends, a pivotal connection between the sections, means for releasably locking the slotted ends of the blocks together comprising a link pivoted in the slot in one of the blocks and adapted to be swung into the slot in the other block, a spring-held collar mounted upon the link and adapted to engage the outer side of the other opposing blocks, and means for adjusting the tension of the spring.

7. The combination with a sectional wind shield having side frame members, of means for hinging the opposing side frame members together comprising at each end a pair of coöperating transverse blocks slotted at their outer ends, a pivotal connection between the sections, means for releasably locking the slotted ends of the blocks together comprising a link pivoted in the slot in one of the blocks and adapted to be swung into the slot in the other block, a collar slidably mounted on the link and adapted to engage the outer side of the opposing block, an adjusting member screw threaded on the link, and a spring intermediate the collar and the adjusting member.

In testimony whereof I have hereunto signed my name in the presence of the two subscribed witnesses.

ARTHUR L. BANKER.

Witnesses:
L. A. MYERS,
J. M. BLAINE.